United States Patent
Cummings et al.

[11] 3,886,334
[45] May 27, 1975

[54] METHOD AND APPARATUS FOR SIMULATING A CLASS OF AIRCRAFT

[75] Inventors: Thomas R. Cummings; William J. Hewitt, both of Binghamton, N.Y.

[73] Assignee: The Singer Company, New York, N.Y.

[22] Filed: June 7, 1973

[21] Appl. No.: 367,804

Related U.S. Application Data

[63] Continuation of Ser. No. 67,358, Aug. 27, 1970, abandoned.

[52] U.S. Cl.................. 235/184; 35/10.2; 35/12 R; 235/193
[51] Int. Cl............................................. G06g 7/72
[58] Field of Search...... 235/150, 184, 151, 1, 61.5; 35/10.2, 12 K, 12 W, 12 R

[56] References Cited
UNITED STATES PATENTS

| | | | |
|---|---|---|---|
| 2,986,821 | 6/1961 | Fogarty................ | 35/12 W |
| 3,341,697 | 9/1967 | Kaufman et al. ................ | 35/10.2 |
| 3,604,897 | 9/1971 | McAdam et al. ............. | 235/61.5 E |
| 3,645,014 | 2/1972 | Bramson et al. .................... | 35/12 K |

OTHER PUBLICATIONS

Korn & Korn (Textbook) McGraw-Hill Co., 1956, Sec. Edit., Chapter on "Small Computer Installations," P. 397–403.

*Primary Examiner*—Felix D. Gruber
*Attorney, Agent, or Firm*—Jeffrey Rothenberg; Charles S. McGuire

[57] ABSTRACT

A flight simulator, or computer section thereof, capable of computing and supplying output signals in real time corresponding to the performance of any of two or more aircraft. The aircraft are members of a defined class having similar aerodynamic and physical characteristics as evidenced by the equations of motion for each aircraft of the class being expressed in common terms. The terms in the equations which may vary in value between aircraft in the class to cause significant performance differences are expressed as conversion constants. Each conversion constant is equal to one for a particular aircraft of the class. A set of values for said constants are thus developed for each of the aircraft in the class which may be used as multipliers in the equations to provide outputs commensurate with performance of any aircraft of the class. The invention also resides in the method of simulating a class of aircraft.

12 Claims, 3 Drawing Figures

METHOD AND APPARATUS FOR SIMULATING A CLASS OF AIRCRAFT

REFERENCE TO RELATED APPLICATIONS

This is a continuation of application Ser. No. 67,358, filed Aug. 27, 1970, and now abandoned.

BACKGROUND OF THE INVENTION

The present invention relates to grounded flight training apparatus and methods of construction thereof. More particularly, the invention is concerned with increasing the versatility of flight training apparatus having simulated controls and instruments operated by a flight computer.

With the increased expense and safety hazards connected with the use of actual aircraft for training purposes, grounded flight trainers and simulators have become an important tool in basic flight instruction. During the course of development of such apparatus, it has been found that in some applications it is economically feasible to construct a training device which duplicates as closely as possible the cockpit, controls and instruments of a specific aircraft. The associated flight computer is programmed according to the parameters of that specific aircraft in order to provide realistic instrument readings, control loading, motion cues, etc., in response to pilot or instructor inputs. Flight training equipment of the type specifically patterned after one particular aircraft has generally been referred to as a simulator.

In other applications, the cost involved in duplicating the performance of a specific aircraft is not justified. In such applications, training apparatus of a more general nature has been found suitable for teaching basic flying skills. The apparatus is not patterned after any specific aircraft, instead representing a composite, nondescript aircraft of some general type. Such apparatus is commonly termed a flight trainer, as opposed to the more costly and sophisticated simulator.

It has been generally assumed that a flight trainer, as defined in the preceding paragraph, is the only alternative to a simulator designed and programmed after one particular aircraft. However, it is often desirable to provide training in a number of different aircraft in applications requiring the degree of realism offered only by a simulator, but where cost considerations make impractical the provision of a different simulator for each such aircraft.

SUMMARY OF THE INVENTION

The present invention is predicated on the grouping of two or more different aircraft having common aerodynamic and physical characteristics into a defined class wherein the equations of motion of each aircraft are expressed in common terms. Those terms in the equations of motion which have values variable between aircraft in the class are expressed as conversion constants. Most of the conversion constants are defined as ratios between variable value terms and terms which have constant values between aircraft of the defined class. Values of the constants for the various aircraft of the class are electronically implemented in a flight computer by appropriate components, thus providing a plurality of circuits representative of the various constants. Selective switching means are provided to include in the active computer circuits only those circuits representing the values of the constants for the particular aircraft to be simulated at the time. Thus, any aircraft of the defined class may be simulated merely by selective positioning of the switching means.

It should be emphasized that the flight computer is operating in real time to solve the integro-differential equations which describe the state vector of the aircraft at each instant. That is, the Newtonian equations of vehicular motion are continuously solved in real time, providing continuous outputs to circuits which control the operation of the simulator. This is to be distinguished from applications wherein equation constants may be changed in a computer for calculating values not involved in a real time situation.

Accordingly, it is a principal object of the present invention to provide grounded flight training apparatus capable of simulating any of a number of different aircraft of a particular class.

A further object is to provide a method of constructing an aircraft flight simulator computer which may be easily and quickly modified to calculate continuously, in response to varying inputs, parameters for any selected one of a number of aircraft.

Still another object is to provide a flight simulator computer having selective switching means for changing the components included in the active computer circuits, thereby changing the computer programming to implement the equations of motion for any one of a plurality of aircraft of a defined class having common aerodynamic and physical characteristics.

A still further object is to provide a flight simulator system capable of corresponding in performance to any of a plurality of aircraft by selectively changing both constants and non-linear functions in the associated flight computer.

In a more general sense, the object of the invention is to provide novel and improved flight simulation equipment wherein a single simulator may be used to simulate any of a plurality of different aircraft.

Other objects will in part be obvious and will in part appear hereinafter.

The invention accordingly comprises the several steps and the relation of one or more of such steps with respect to each of the others and the apparatus embodying features of construction, combinations of elements and arrangements of parts which are adapted to effect such steps, all as exemplified in the following detailed disclosure and the scope of the invention will be indicated in the claims. For a fuller understanding of the nature and objects of the invention reference should be had to the following detailed description taken in connection with the accompanying drawings.

DESCRIPTION OF THE PREFERRED EMBODIMENT

To be effective for training purposes, the instruments, controls, etc., of a flight simulator must perform in the same manner as those of the aircraft being simulated. To accomplish this an analog or digital computer implementing the proper equations is used to control the operation of the simulator. The basic equations used are flight (equations of motion) and engine equations. The equations of motion are well known aerodynamic equations the derivation of which may be found in "Dynamics of Flight" by Bernard Etkin (John Wiley and Son, Inc., New York, New York 1959). For use in the simulator the rigorous equations found in that work are simplified by using small angle approximations and are referenced to the wind axis.

The manner in which such equations may be implemented in analog computing hardware is disclosed in U.S. Pat. No. 3,513,246, granted to S. R. Fisch et al. on May 19, 1970 and assigned to the same assignee as the present invention, which by reference is hereby incorporated in this specification.

Generally, when equations of motion for a simulator are being developed, data giving all of the aerodynamic and physical characteristics of the actual aircraft is used to develop the equations, which are then implemented in the analog or digital computer. This results in a different set of computing hardware for each simulator. However, an examination of the equations for a number of aircraft of a class, e.g., twin engine jet aircraft, shows a marked similarity in many parameters. This is to be expected since aircraft designers all must work with the same physical constraints. The problem then is to take a set of equations developed for one aircraft and transform them so that the parameters which do cause significant changes in performance can be entered into the equations as constants. If this can be done, all that will be required to cause a simulator designed for one aircraft, e.g., a Sabreliner, to perform as another aircraft, e.g., a DC-9, will be to change the value of a small number of constants in the equations, which in the mechanized version may be accomplished by changing the values of resistors. In addition, a much smaller amount of aircraft data will be required to construct the simulator.

The first step, therefore, in providing a simulator capable of performing as any of two or more different aircraft is to define the class which includes such aircraft. The aerodynamic and physical characteristics of each aircraft must, of course, be known and are used to develop the equations of motion for each aircraft. The equations are then examined and all those which are expressed in common terms relate to aircraft of a common class. Conversely stated, a class of aircraft may be defined as those aircraft having equations of motion expressed in common terms.

Figure 1:
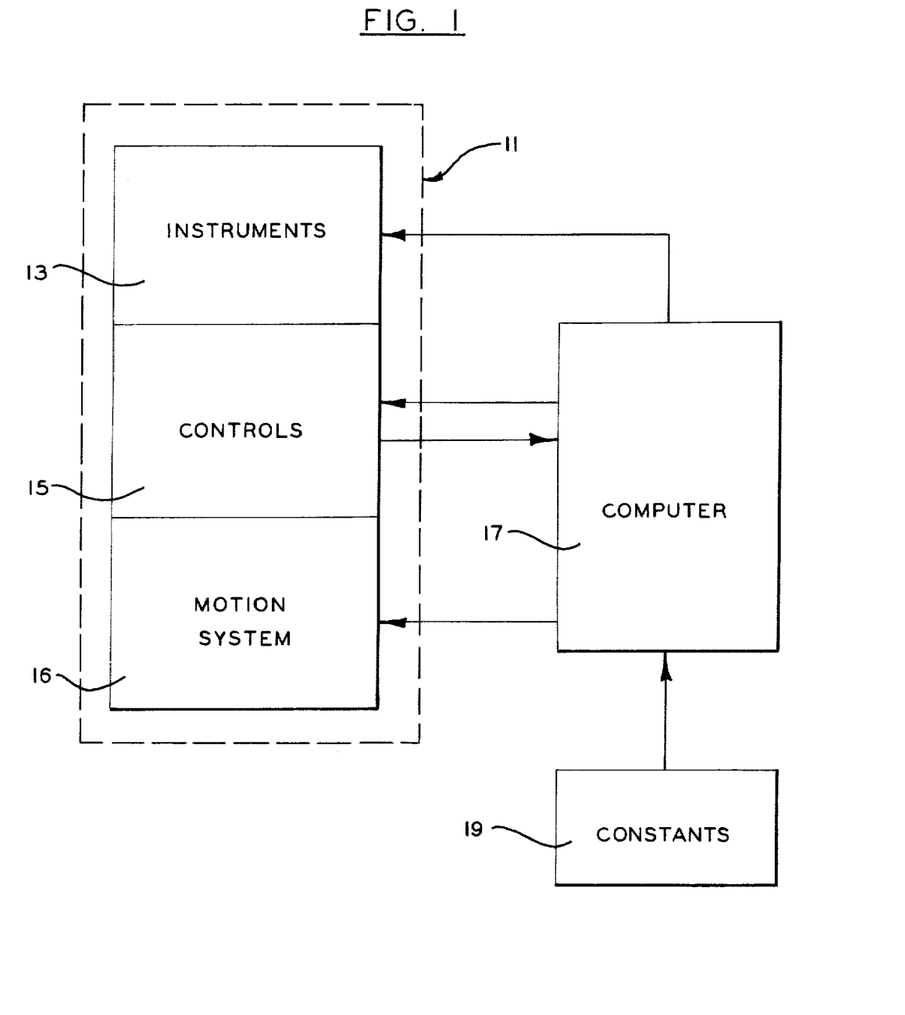
FIG. 1 is a block diagram showing the basic elements of the invention as used in the preferred embodiment.

Referring now to the drawing, FIG. 1 is a simplified block diagram of a typical embodiment of the invention. Cockpit 11 in which the pilot trainee sits has the normal aircraft instruments, e.g., airspeed, turn and bank, exhaust temp., etc., collectively indicated by the block numbered 13, and the usual controls including rudder, stick, throttles, etc., indicated by block 15. This cockpit 11 is mounted on a motion system base indicated by block 16. Outputs from the controls, reflecting movement thereof by the trainee, are represented by electrical signals directed to a computer 17, which is similar to that disclosed in the aforementioned patent, and used to mechanize the equations of motion and engine equations. Analog outputs from computer 17 provide the inputs to the instruments 13 and to the motion system 16 and control loading signals to the controls 15. A detailed description of the interface between the cockpit and computer may be found in columns 2—5 of the referenced Fisch et al patent. The remaining block 19 is a means of providing the required constants to the equations of motion to cause them to correspond to those of a desired aircraft, and will be further explained below.

Any aircraft has 6 degrees of freedom in motion, 3 rotational and 3 translational degrees, all of which must be calculated in the simulator equations of motion. As an example of how the present invention may be used, the calculation of the constants for use with the absolute magnitude of the velocity vector ($V_p$) and the implementation of the resulting equation will be shown in detail. The equation for $V_p$, with small angle approximations, is:

$$V_p = \int 32.2 \ [ \ (1/W_a \ (F_x + T_n) - \sin \gamma \ ] \ dt \tag{1}$$

where $W_a$ = Total airplane gross weight
$F_x$ = Projection of the total applied force on the $x$ body axis not including gravity and thrust
$T_n$ = Engine thrust
$\gamma$ = Flight path elevation angle.

This can be expressed in terms of acceleration, $\dot{V}_p$:

$$\dot{V}_p = 32.2 \ ([F_x/W_a] + [T_n/W_a - \sin \gamma) \tag{2}$$

This is then an equation expressing Newton's Law F = ma. The force $F_x$ is primarily drag. $T_n$ is thrust and 32.2 sin $\gamma$ gives the component due to gravity. The equation for $F_x$ is:

$$F_x = -q \ S \left[ C_{D_0} + \frac{\partial C_D}{\partial C_L} C_L^2 + \Delta C_{D_{Wing \ Flaps}} + \Delta C_{D_{Speed \ Brakes}} + \Delta C_{D_{Landing \ Gear}} \right] \tag{3}$$

where
- $q$ is the dynamic pressure,
- $S$ is the wing area, and the quantity in the brackets represents various drag coefficients.

For simplification the drag coefficients may be represented by $C_D$.

The equation then becomes $$F_x = -q S C_D. \tag{4}$$

Substituting into the $\dot{V}_p$ equation (2) results in $$\dot{V}_p = 32.2 \left[ -q C_D (S/W_g) + (T_n/W_g) - \sin \gamma \right]. \tag{5}$$

We will assume that the equations of motion for a number of aircraft having common aerodynamic and physical characteristics (e.g., twin engine jet aircraft with the engines mounted on the aft part of the fuselage) have been developed, compared, and found to be expressed in common terms.

We will further assume that equation (5) has been developed using the values and parameters associated with a Sabreliner and see what must be done to transform it, so that by changing the value of constants it will represent a DC-9 or other aircraft of the defined class. The equation representing the acceleration vector of the Sabreliner is:

$$\dot{V}_{p_s} = 32.2[-q C_{D_s} (S_s/W_{g_s}) + (T_{n_s}/W_{g_s}) - \sin \gamma] \tag{6}$$

where the subscript $s$ denotes the Sabreliner.

Maximum weight of an aircraft ($W_{g_{max}}$) is composed of its empty weight ($W_g$) plus its payload and fuel weight. The payload and fuel tankage ratios of the aircraft of the defined class are the same as their maximum weight ratios. Therefore, the ratio of empty to maximum weight of the Sabreliner with respect to another aircraft of the class may be expressed:

$$W_g = W_{g_s} \left( \frac{W_{g_{max}}}{W_{g_{s_{max}}}} \right) \tag{7}$$

Since the wing area-empty weight relationship is the same for all aircraft of the defined class, the $S/W_g$ term in the $\dot{V}_p$ equation (5) can now be expressed as $$\frac{S}{W_g} = \left( \frac{S}{W_{g_{max}}} \right) \left( \frac{W_{g_{max}}}{W_g} \right) \left( \frac{S_s}{W_{g_{s_{max}}}} \right) \left( \frac{W_{g_{s_{max}}}}{S_s} \right) \tag{8}$$

Substituting for $W_g$ from equation (7)

$$\frac{S}{W_g} = \left( \frac{S}{W_{g_{max}}} \right) \left( \frac{W_{g_{max}}}{W_{g_s}} \right) \left( \frac{W_{g_{s_{max}}}}{W_{g_{max}}} \right) \left( \frac{S_s}{W_{g_{s_{max}}}} \right) \left( \frac{W_{g_{s_{max}}}}{S_s} \right) \tag{9}$$

This reduces to $$\frac{S}{W_g} = \left( \frac{S_s}{W_{g_s}} \right) \left( \frac{W_{g_{s_{max}}}}{S_s} \right) \left( \frac{S}{W_{g_{max}}} \right) \tag{10}$$

and $$\frac{S}{W_g} = \frac{S_s}{W_{g_s}} \left[ \left( \frac{S}{W_{g_{max}}} \right) \div \left( \frac{S_s}{W_{g_{s_{max}}}} \right) \right] \tag{11}$$

The quantity in brackets is defined as a constant, $K_1$:

$$\left[ \frac{S}{W_{g_{max}}} \div \frac{S_s}{W_{g_{s_{max}}}} \right] = K_1 \quad (12)$$

which is the wing loading ratio of the two aircraft.

Remembering from equation (7) that $$W_g = W_{g_s} \left( \frac{W_{g_{max}}}{W_{g_{s_{max}}}} \right) \quad (13)$$

then the $T_n/W_g$ term becomes $$\frac{T_n}{W_g} = \frac{T_n}{W_{g_s}} \left( \frac{W_{g_{s_{max}}}}{W_{g_{max}}} \right) \quad (14)$$

Now these terms may be substituted into the $\dot{V}_p$ equation giving $$\dot{V}_p = 32.2 \left[ -q\, C_{D_s} \frac{S_s}{W_{g_s}} K_1 + \frac{T_n}{W_{g_s}} \left( \frac{W_{g_{s_{max}}}}{W_{g_{max}}} \right) - \sin \gamma \right] \quad (15)$$

If $-q\, C_{D_s} S_s$ is replaced with $F_{x_s}$, from equation (4) the equation becomes:

$$\dot{V}_p = 32.2 \left[ \frac{1}{W_{g_s}}(F_{x_s} K_1 + T_n \frac{W_{g_{s_{max}}}}{W_{g_{max}}}) - \sin \gamma \right] \quad (16)$$

If the other aircraft has the same top speed as the Sabreliner but different gross weight then, $$K_1 F_{x_s} \text{ top speed} = (T_n) \text{ top speed} \left( \frac{W_{g_{s_{max}}}}{W_{g_{max}}} \right) \quad (17)$$

since at a constant velocity the two forces must be equal in order to result in zero acceleration. For the Sabreliner:

$$(F_{x_s}) \text{ top speed} = (T_{n_s}) \text{ top speed} \quad (18)$$

Therefore, substituting into equation (17):

$$K_1 (T_{n_s}) \text{ top speed} = (T_n) \text{ top speed} \left( \frac{W_{g_{s_{max}}}}{W_{g_{max}}} \right) \quad (19)$$

Substituting this into the $\dot{V}_p$ equation we have:

$$\dot{V}_p = 32.2[(K_1/W_g)(F_{x_s} + T_{n_s}) - \sin \gamma] \quad (20)$$

This indicates that $K_1$ will also correct $T_{n_s}$ for differences in aircraft weight. However, assuming equal gross weights and different top speeds, $$\frac{W_{g_{s_{max}}}}{W_{g_{max}}}$$

equals 1, and $$K_1 F_{x_s} = T_n \quad (21)$$

at the new aircraft's top speed.

If we assume that $K_1 K_2 T_{n_s} = K_1 F_{x_s}$ then:

$$K_2 = F_{x_s}/T_{n_s} \quad (22)$$

evaluated at the new aircraft's top speed and $$\dot{V}_p = 32.2[(K_1/W_{g_s})(F_{x_s} + K_2 T_{n_s}) - \sin \gamma] \quad (23)$$

since the equality which was established at top speed is assumed to apply at all speeds.

However, an aircraft that has the same top speed as the Sabreliner ($K_2 = 1$) and the same gross weight but different wing area ($K_1$ not equal to 1) will most likely have the same acceleration characteristics, i.e., $\dot{V}_p = \dot{V}_p$.

The above equation will not give the proper results in this case. But if the steady state cruise and climb case is considered where $\dot{V}_p = 0$ then $$0 = 32.2 [(K_1/W_{g_s})(F_{x_s} + K_2 T_{n_s}) - \sin \gamma] \quad (23a)$$

Dividing by $K_1$ results in $$0 = 32.2 [1/W_{g_s}(F_{x_s} + K_2 T_{n_s}) - (\sin \gamma/K_1)] \quad (23b)$$

whereby the following equation which results from the various abovedescribed assumptions and engineering tradeoffs, satisfies all cases:

$$\dot{V}_p = 32.2[(1/W_{g_s})(F_{x_s} + K_2 T_{n_s}) - (\sin \gamma/K_1)] \quad (23c)$$

Comparing equation (23c) with the basic Sabreliner equation (6) for $\dot{V}_p$ it is evident that we have developed two constants which may be used in that equation to convert it to an equation representative of another aircraft. Also, the only additional information required concerning the new aircraft is its maximum weight, wing area and top speed.

Figure 2:
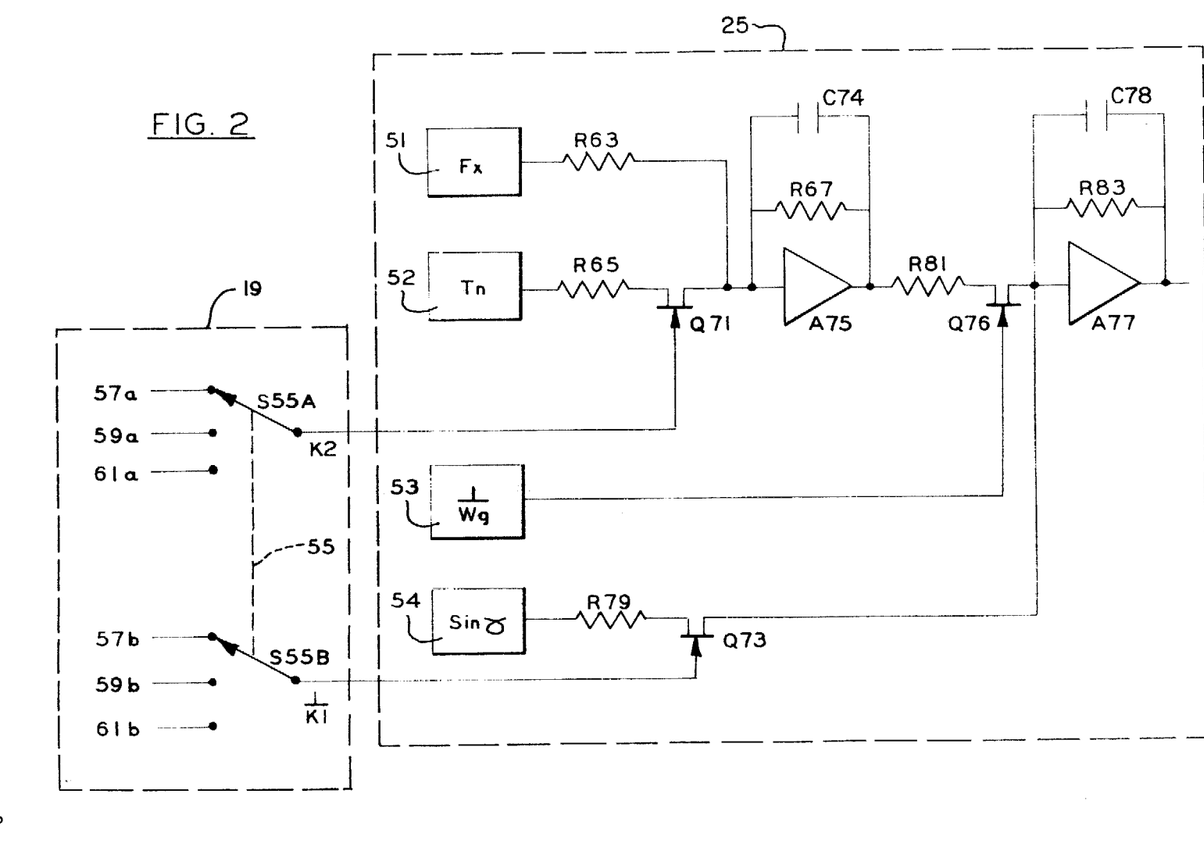
FIG. 2 is an electrical schematic showing an example of a portion of a computer which may be used to implement the invention.

These equations may be implemented in a computer using standard analog techniques as shown in the text "Electronic Analog and Hybrid Computers" by G. A. and T. M. Korn (McGraw Hill Book Company, New York, N.Y., 1964). An example of circuits using such techniques may be found in U.S. Patent No. 2,925,667 granted to L. E. Fogarty on Feb. 23, 1960. However, the preferred embodiment is that disclosed in the Fisch et al patent referenced herein. As indicated therein Field Effect Transistors may be used to perform multiplication. Hence the required multiplications by the derived constants may be accomplished as shown in FIG. 2 by $v_p$ generator 25, which represents one of the active circuits of computer 17 — after "2". The quantities $F_r$, $T_n$, $1/W_a$ and $\sin \gamma$ shown by blocks 51-54 are computed in the manner described in the Fisch et al patent. Inputs for the constants $K_2$ and $1/K_1$ needed in computing $\dot{V}_p$ from equation (23c) are obtained from switch 55, the $K_2$ input from S55A and the $1/K_1$ input from S55B. The inputs 57a and 57b have on them properly scaled time division signals which represent respectively the proper values of constants $K_2$ and $1/K_1$ for one of the aircraft to be simulated, 59a and 59b the values for a second aircraft and 61a and 61b those for a third aircraft.

Each time division signal comprises a rectangular wave having a pulse width representative of the proper value. These signals are preferably generated in the manner described in column 14, line 28 ff of the referenced Fisch et al. patent, i.e., by applying a triangular wave and a signal representative of a conversion constant to a differential amplifier. The amplifier produces rectangular pulses having a width directly proportional to the amplitude of the input conversion constant signal.

A separate circuit can be employed to generate each required time division signal or preferably, one such circuit can be used to generate all the time division signals for a particular conversion constant. The latter circuit would include means, such as a potentiometer or resistor-switching network, to vary the amplitude of the input conversion constant signal and thus the duration of the output pulses. Of course, other conventional time division circuits and/or rectangular wave generators might also be used.

Returning to FIG. 2, the $T_n$ quantity from block 52 is multiplied by $K_2$ using field effect transistor Q71. This quantity is then integrated and summed with $F_x$ from block 51 by amplifier A75, operating in conjunction with capacitor C74 connected across it, in the manner described in column 13, line 60 through column 14. Resistors R63, R65, and R67 provide the proper scaling in a manner well known in the art. The resulting output of amplifier A75 is $-(F_x + K_2 T_n)$. This quantity is then multipled at transistor Q76 by $1/W_a$ to produce a pluse representing $-1/W_a(F_x + K_2 T_n)$. The value of $\sin \gamma$ from block 54 is multiplied at transistor Q73 by $1/K_1$ resulting in a pulse representing $\sin \gamma/K_1$. This pulse along with the $1/W_a(F_x + K_2 T_n)$ pulse from Q76, is then integrated and summed by amplifier A77, acting in conjunction with capacitor C78, (per column 13, line 60 ff of Fisch et al) resulting in $+ (1/W_a) (F_x + K_2 T_n) - \sin \gamma/K_1$. This is the desired $\dot{V}_p$ from equation (23c) with the exception of 32.2 which multiplies the equation. It is obvious to those skilled in the art that by properly scaling the resistors R63, R65, and R67 associated with amplifier A75 and R79, R81 and R83 associated with amplifier A77 the desired multiplication by 32.2 will be achieved. Using the same relationships as were used to develop $\dot{V}_p$, equation for angle of attach, $\alpha$ and side slip, $\beta$ may be developed as follows:

$$\dot{\alpha} = (1845/V_p)[K_1 \, q \, C_L(S_s/W_{a_s}) + K_8 \, T_{n_s} \sin \alpha + \cos \phi \,] + q_a \quad (24)$$

$$\dot{\beta} = (1845/V_p) \, [K_1 \, q \, C_Y(S_s/W_{a_s}) + \sin \phi \,] - r_a \quad (25)$$

where $$K_8 = K_1 K_2 \frac{W_{g_{max}}}{W_{g_{s_{max}}}} \quad (26)$$

Similar methods are used to develop rotational equations resulting in the following:

$$\dot{p}_a = (K_3/I_{xx_s})(q \, S_s \, b_s \, C_l) \quad (27)$$

$$\dot{r}_a = (K_3/I_{zz_s})(q \, S_s \, b_s \, C_n) \quad (28)$$

$$\dot{q}_a = (K_3/I_{yy_s})(q \, S_s \, b_s \, C_m) \quad (29)$$

where
$\dot{p}_a$ = the projection of the absolute rotational vector on the X body axis
$\dot{q}_a$ = the projection of the absolute rotational vector on the Y body axis
$\dot{r}_a$ = the projection of the absolute rotational vector on the Z body axis
$I_{xx}, I_{yy}, I_{zz}$ = moments of inertia about the X, Y, Z body axes
$C_l, C_n, C_m$ = respectively, the rolling moment, yawing moment, and pitching moment coefficients
$b$ = wing span
and $$K_3 = K_1 \, (b_s/b) \quad (30)$$

This last constant takes into account differences in wing span. A similar constant $$K_7 = b/b_s \quad (31)$$

is developed for use in the body axis force component equations.

It is also necessary to change the engine parameters which will be indicated to the pilot on his instruments. If it is assumed that the ratios of maximum fuel flow rate are the ratios of any fuel flow rate then $$W_{f_I} = W_{f_s} \left( \frac{W_{f_{max}}}{W_{f_{s_{max}}}} \right) \quad (32)$$

where $W_{f_I}$ is the indicated fuel flow. If a constant is defined as $$K_4 = \frac{W_{f_{max}}}{W_{f_{s_{max}}}} \quad (33)$$

then $$W_{f_I} = W_{f_s} K_4 \quad (34)$$

A similar constant used in determining the indicated turbine exhaust temperature (EGT) can be defined as follows:

$$-K_5 = EGT_{max}/EGT_{s_{max}} \text{ X } \text{ thus } EGT_I = EGT_s K_5 \quad (35)$$

To indicate the engine pressure ratio (EPR) the constant $K_6$ is defined as $$K_6 = EPR_{max}/EPR_{s_{max}} \text{ thus } EPR_I = EPR_s K_6 \quad (36)$$

These equations may be implemented as computer circuits in a manner similar to that for $V_p$ shown in FIG. 2. (This preferred manner of mechanizing arithmetic functions is described in detail in the Fisch et al patent, column 13, line 49ff.)

Figure 3:
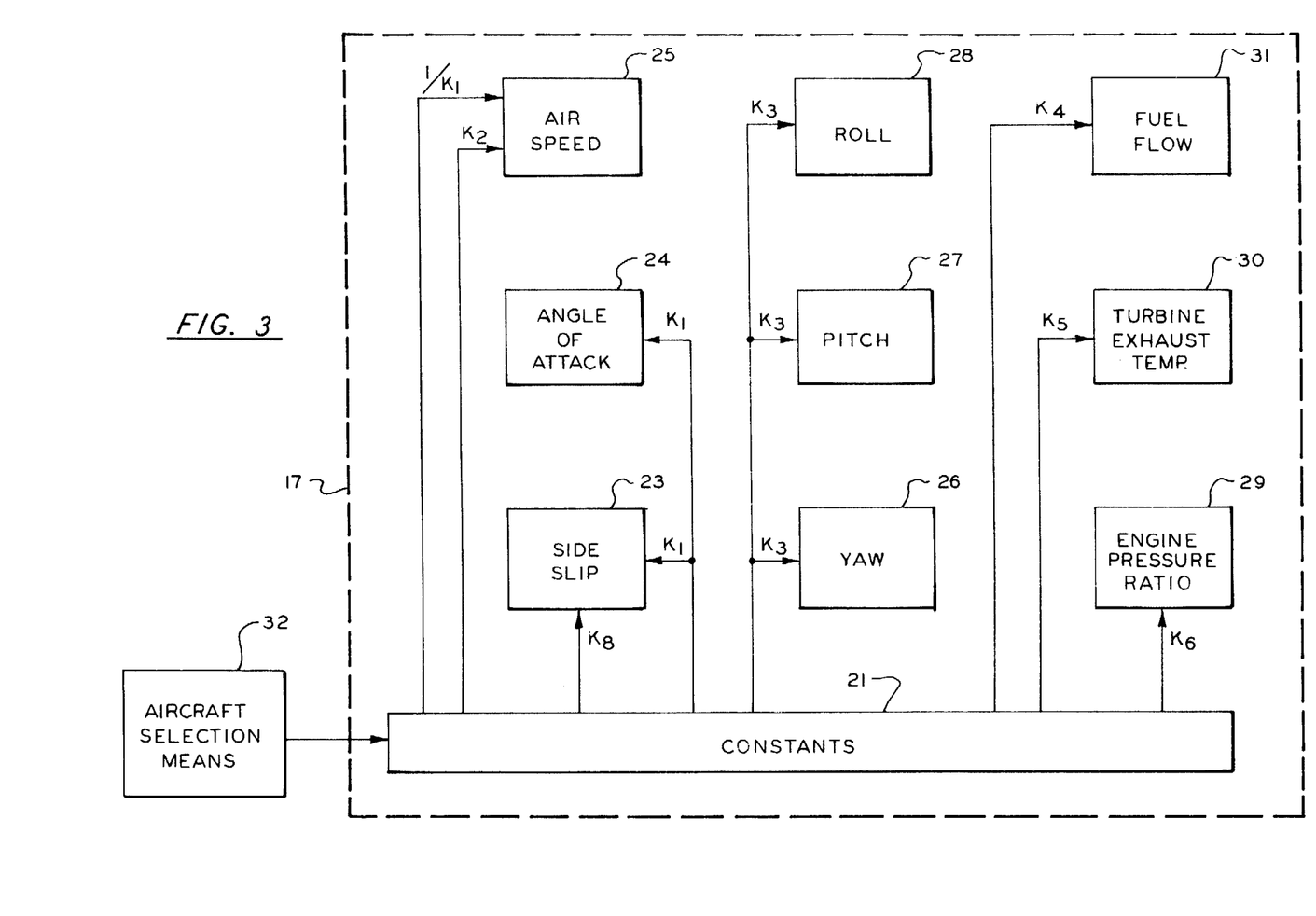
FIG. 3 is a block diagram illustrating active computer circuits which implement flight and engine equations along with the conversion constant signals supplied thereto.

The various computer circuits which implement the above derived flight and engine equations are illustrated in block form in FIG. 3, along with the conversion constants which are applied to each circuit. In the depicted embodiment, signals representing the values of the conversion constants are provided by block 21, within computer 17, to active circuits 23–31 under control of aircraft selection means 32. In an analog version, the active circuits would preferably be interconnected in a manner similar to that illustrated in FIGS. 1A and 1B of the referenced Fisch et al patent (e.g., circuit 25 would generally replace Fisch's Airspeed Generator 131), block 21 would comprise time division circuits and aircraft selection means 32 could be a resistor switching or resistance varying network. In digital form, block 21 might comprise an updatable memory in which one or more sets of values for the constants could be stored and block 32 might represent a keyboard or other input device for varying or calling up the appropriate set of values.

If additional instrument indications are required additional constants may be defined although those listed will in most cases be sufficient. It is also possible to extend the flexibility of the simulator to aircraft which fall outside the class for which it is designed by the addition of an ability to switch between two or more of the nonlinear functions which differ from one class of aircraft to another, e.g., by having a computation section for use with jet aircraft and another for use with propeller driven aircraft.

The present invention offers a combination of versatility and fidelity of simulation previously unattainable. The equations describing performance of a class of aircraft having common physical and aerodynamic characteristics are arranged to express, as ratios, those parameters which significantly affect performance. Appropriate constants are thus established to be used as multipliers in equations otherwise common to all aircraft of the class. The constants are represented by time division signals of appropriate value and selective switching means provided for feeding to the active computer circuits, the signals representing the desired constants. Thus, the simulator will accurately reflect the performance characterisitcs of any aircraft of the class for which constants have been developed and implemented in the switching means.

In addition, the invention may be used when constructing a simulator for a second aircraft in a class where a first simulator for a different aircraft has been constructed. Instead of developing a complete new set of equations using all of the aircraft parameters, the proper constants may be calculated using a few parameters and the resulting equations implemented in the second simulator.

Although the invention is disclosed in connection with an analog computer for flight equations, the techniques involved are equally applicable to digital computers used in such computations wherein the desired conversion constants may be stored in updatable memory locations of said digital computer. The invention may also be applicable in other types of simulators.

What is claimed is:

1. Apparatus for simulating in real time any selected vehicle of a predetermined class of vehicles having common operational and physical characteristics, comprising:
    a trainee station having simulated controls and instruments for providing outputs representative of a trainee's operation of the simulated controls and for receiving inputs representative of instrument readings;
    computing means for receiving and processing said outputs according to motion and engine equations for said class of vehicles, said equations being expressed in terms of vehicle parameters for one vehicle of said class and conversion constants which compensate for differences in performance between said one vehicle and the other vehicles of said class; and
    means for providing to said computing means electrical signals representative of values of the conversion constants for any selected vehicle of said class, said computing means employing said electrical signals to process said outputs and produce said inputs, whereby said selected vehicle is simulated.

2. The apparatus of claim 1 wherein said vehicles comprise aircraft having common aerodynamic and physical characteristics, said trainee station comprises a simulated cockpit, and said motion equations comprise flight equations.

3. The apparatus of claim 1, wherein the means for providing electrical signals comprises:
    means for generating a set of electrical signals representative of a set of values of said conversion constants for each of said vehicles in said class; and means for selectively providing any one of said sets of electrical signals to said computing means.

4. In a flight simulator capable of real time simulation of any aircraft of a class of aircraft having common aerodynamic and physical characteristics, the combination comprising:
  a. a computer having active circuits for electronically implementing flight and engine equations representative of the performance of one of the class, said equations being in a form such that terms in said equations which have substantially different values between aircraft in said class are expressed as conversion constants, said conversion constants compensating for significant differences in performance between said one aircraft and the other aircraft of said class;
  b. means for electronically implementing sets of values for said constants, each set representing a different aircraft of said class, the value of each of said conversion constants in the set corresponding to said one aircraft being equal to one; and
  c. means for selectively including in the active circuits of said computer the electronic implementation of any one of said sets of values, whereby any aircraft of said class can be simulated.

5. The invention according to claim 4 wherein said means for selectively including comprise manually positionable switching means.

6. Grounded flight training apparatus comprising, in combination:

a. a simulated cockpit having controls and instruments;
  b. a flight computer working in real time to provide outputs for operating said controls and instruments in accordance with the performance of any one of a plurality of aircraft, said computer having circuits electronically implementing equations describing performance of a class of aircraft having common aerodynamic and physical characteristics, said equations including conversion constants representing those terms in the equations having different values for different aircraft of the class and causing significant differences in performance for the various aircraft of the class, said computer further having a plurality of components electronically implementing values of said conversion constants for the different aircraft of said class; and
  c. means for selectively including in the active circuits of said computer selective ones of said components corresponding to the values of said conversion constants associated with any aircraft of said class.

7. The invention according to claim 6 wherein the values of said conversion constants are equal to one for a particular aircraft of the class and said values are precomputed without reference to the aerodynamic coefficients of the other aircraft of said class.

8. The invention according to claim 6 wherein said computer is an analog computer and said components comprise means providing scaled time division signals representing said value.

9. The invention according to claim 6 wherein said computer is a digital computer.

10. A method of simulating in real time any selected one of a class of vehicles having common operational and physical characteristics, comprising the steps of:
  providing a computer which implements a set of motion and engine equations representing the performance of said class of vehicles, said equations containing vehicular parameters for one member of said class of vehicles and conversion constants which compensate for differences in performance between said one member and the other members of said class;
  providing control signals indicative of a trainee's operation of simulated vehicular controls to said computer;
  providing signals to said computer representative of values of the conversion constants for the vehicle selected to be simulated;
  processing said control signals and signals representative of values of the conversion constants in said computer according to said motion and engine equations to produce output signals indicative of the performance of said selected vehicle; and
  providing said output signals to simulated instruments, whereby the performance of said selected vehicle is simulated.

11. The method of claim 10 wherein the step of providing signals representative of values of the conversion constants for the selected vehicle comprises:
  generating a set of values of said signals representative of a set of conversion constants for each vehicle of the class; and
  selectively providing any one of said sets of signals to said computer.

12. The method of claim 10 wherein said vehicles comprise aircraft having common aerodynamic and physical characteristics and said motion equations comprise flight equations.

* * * * *